(12) United States Patent
Schwalm et al.

(10) Patent No.: US 6,479,564 B1
(45) Date of Patent: Nov. 12, 2002

(54) ISOCYANATE-BASED HARDENABLE PREPARATIONS

(75) Inventors: Reinhold Schwalm, Wachenheim (DE); Bernd Bruchmann, Freinsheim (DE); Erich Beck, Ladenburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/857,190

(22) PCT Filed: Dec. 22, 1999

(86) PCT No.: PCT/EP99/10291

§ 371 (c)(1),
(2), (4) Date: Jun. 20, 2001

(87) PCT Pub. No.: WO00/39182

PCT Pub. Date: Jul. 6, 2000

(30) Foreign Application Priority Data

Dec. 23, 1998 (DE) .......................... 198 60 049

(51) Int. Cl.[7] .............................. C08G 18/63
(52) U.S. Cl. ................... 522/96; 522/97; 528/49; 528/75; 526/301; 428/422.8; 428/423.1; 427/385.5
(58) Field of Search ................ 522/97, 96; 528/49, 528/75; 526/301; 428/422.8, 423.1; 427/385.5

(56) References Cited

U.S. PATENT DOCUMENTS

| | | |
|---|---|---|
| 4,478,894 A | 10/1984 | Tanaka et al. |
| 4,603,181 A | 7/1986 | Nishino et al. |
| 4,879,410 A | 11/1989 | Singh et al. |
| 5,475,038 A | 12/1995 | Skoultchi |
| 5,658,672 A | 8/1997 | Lenke et al. |

FOREIGN PATENT DOCUMENTS

| | | |
|---|---|---|
| EP | 0 658 582 | 6/1995 |
| GB | 1 379 228 | 1/1975 |

*Primary Examiner*—Rachel Gorr
(74) *Attorney, Agent, or Firm*—Oblon, Spivak, McClelland, Maier & Neustadt, P.C.

(57) ABSTRACT

A curable composition comprises a prepolymer which comprises, in copolymerized form:

(a) an on-average at least bifunctional isocyanate based on a compound of the formula I

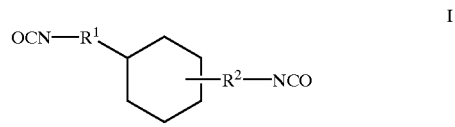

where $R^1$ and $R^2$ are independently $C_1$–$C_{12}$-alkylene, (b) an ethylenically unsaturated compound containing isocyanate-reactive groups and (c) if desired, a saturated compound containing isocyanate-reactive groups.

7 Claims, No Drawings

ISOCYANATE-BASED HARDENABLE PREPARATIONS

The present invention relates to curable, in particular radiation-curable, compositions comprising a prepolymer based on a polyisocyanate and isocyanate-reactive ethylenically unsaturated compounds, to their use for coating substrates and to the coated substrates obtainable in this way.

Radiation-curable compositions have achieved wide use in industry, in particular as high-quality coating materials for surfaces. For the purposes of the present invention, radiation-curable compositions are compositions which comprise ethylenically unsaturated polymers or prepolymers and which, if appropriate after a physical drying step, are cured by action of high-energy radiation, for example by irradiation with UV light or by irradiation with high-energy electrons (electron beam).

Radiation-curable compositions are used predominantly in the coating of wood, paper and plastics. The coatings obtained should be very flexible and abrasion-resistant. For exterior applications, the coatings should also be stable to weathering and not undergo yellowing. Further requirements are a high scratch resistance and chemical resistance.

Thermally curing polyurethane compositions are used, for example, in surface coatings for automobiles.

Known curable polyurethane compositions frequently comprise aliphatic isocyanurates as isocyanate component, e.g. on the basis of isophorone diisocyanate (IPDI) or hexamethylene diisocyanate (HDI). However, the products based on HDI have the disadvantage of a poor chemical stability while the products based on IPDI have unsatisfactory scratch resistance. On the other hand, urethane acrylates based on aromatic isocyanates have a high tendency to undergo yellowing.

It is an object of the present invention to provide curable compositions based on a polyisocyanate and isocyanate-reactive ethylenically unsaturated compounds which lead to coatings having a high scratch resistance, good chemical stability, low tendency to undergo yellowing and good weathering resistance.

We have found that this object is achieved by a curable composition comprising a prepolymer which comprises, in copolymerized form:

(a) a bifunctional or polyfunctional isocyanate based on a compound of the formula I

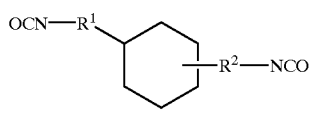

where $R^1$ and $R^2$ are independently $C_1$–$C_{12}$-alkylene, (b) an ethylenically unsaturated compound containing isocyanate-reactive groups and (c) if desired, a saturated compound containing isocyanate-reactive groups.

Preferably, $R^1$ and $R^2$ are independently $C_1$–$C_4$-alkylene such as methylene, 1,2-ethylene, 1,2-propylene, 1,3-propylene or 1,4-butylene.

The composition of the present invention generally comprises:

from 20 to 100% by weight, preferably from 20 to 80% by weight, of prepolymer, from 0 to 80% by weight, preferably from 10 to 50% by weight, of reactive diluent from 0 to 80% by weight of solvent or a solvent mixture, from 0 to 20% by weight, preferably 0.1–10% by weight, of initiator and from 0 to 20% by weight of further auxiliaries.

The prepolymer is the reaction product of an on average at least bifunctional polyisocyanate based on a compound of the formula I and an ethylenically unsaturated compound containing isocyanate-reactive groups, if desired with concomitant use of saturated compounds containing isocyanate-reactive groups.

The bifunctional or polyfunctional isocyanate is either a compound of the formula I or preferably an oligomerization product, in particular a trimerization product, thereof. Such polyisocyanates are obtained in a manner known per se by oligomerization of a compound of the formula I, preferably to an NCO content of the reaction mixture of from 40 to 20% by weight, in particular from 39 to 30% by weight, and subsequent stopping of the reaction and, if desired, removal of unreacted compound of the formula I by distillation. The oligomerization can be carried out in the presence of suitable catalysts such as quaternary ammonium salts, e.g. N,N,N-trimethyl-N-(2-hydroxypropyl)ammonium 2-ethylhexanoate or N,N,N-trimethyl-N-(2-hydroxypropyl) ammonium hydroxide. To stop the oligomerization reaction, the catalyst is decomposed thermally or a suitable substance which deactivates the catalyst is added. Substances which are suitable for this purpose are, for example, acids such as p-toluenesulfonic acid or dibutyl phosphate.

Preferred polyisocyanates based on a compound of the formula I contain at least one uretdione, isocyanurate, biuret and/or allophanate group per molecule.

Particularly preferred representatives of compounds of the formula I are 1,3- and 1,4-bis(isocyanatomethyl)cyclohexane and mixtures thereof.

The polyisocyanates based on compounds of the formula I may, if desired, be present in admixture with other polyisocyanates. The other polyisocyanates are preferably used in such an amount that less than 50%, in particular less than 30%, of the total number of NCO groups originate from the polyisocyanates which do not correspond to the formula I. The other polyisocyanates are usually tetramethylene diisocyanate, hexamethylene diisocyanate (1,6-diisocyanatohexane), octamethylene diisocyanate, decamethylene diisocyanate, dodecamethylene diisocyanate, trimethylhexane diisocyanate or tetramethylhexane diisocyanate, 1,4-, 1,3- or 1,2-diisocyanatocyclohexane, 4,4'-di(isocyanatocyclohexyl)methane, 1-isocyanato-3,3,5-trimethyl-5-(isocyanatomethyl)cyclohexane (isophorone diisocyanate), 2,4- or 2,6-diisocyanato-1-methylcyclohexane, 2,4-diisocyanatotoluene, 2,6-diisocyanatotoluene, tetramethylxylylene diisocyanate, 1,4-diisocyanatobenzene, 4,4'- and 2,4'-diisocyanatodiphenylmethane, p-xylylene diisocyanate and isopropenyldimethyltolylene diisocyanate. Preference is given to the aliphatic and cycloaliphatic diisocyanates. Here too, the oligomerization products of these diisocyanates, which generally contain a uretdione, isocyanurate, biuret and/or allophanate group, are particularly useful. The adducts of diisocyanates with trifunctional alcohols such as glycerol, trimethylolethane, trimethylolpropane, etc., or with triamines are also suitable.

"Isocyanate-reactive groups" are functional groups which can undergo an addition reaction with OCN groups to form a covalent bond, i.e. particularly OH, SH, $NH_2$ or COOH groups.

OH-containing ethylenically unsaturated compounds for reaction with the polyisocyanates are generally selected from among the esters of ethylenically unsaturated carboxylic acids such as acrylic acid, methacrylic acid, crotonic acid, acrylamidoglycolic acid, methacrylamidoglycolic acid and vinylacetic acid with a diol or polyol having preferably 2-20 carbon atoms, e.g. ethylene glycol, diethylene glycol, triethylene glycol, 1,2-propylene glycol, 1,3-propylene glycol, dipropylene glycol, tripropylene glycol, 1,4-butanediol, 1,5-pentanediol, neopentyl glycol, 1,6-hexanediol, 2-methylpentane-1,5-diol, 2-ethylbutane-1,4-diol, 1,4-dimethylolcyclohexane, glycerol, trimethylolethane, trimethylolpropane, trimethylolbutane, pentaerythritol, ditrimethylolpropane, erythritol and sorbitol, as long as the ester has at least one OH group which is reactive toward isocyanate. Furthermore, it is also possible to use the amides of the abovementioned ethylenically unsaturated carboxylic acids with aminoalcohols, e.g. 2-aminoethanol, 3-amino-1-propanol, 1-amino-2-propanol or 2-(2-aminoethoxy) ethanol, and also the vinyl, allyl and methallyl ethers of the abovementioned diols or polyols, as long as they still have a free OH group. Preference is given to the esters of acrylic acid and of methacrylic acid, e.g. 2-hydroxyethyl (meth) acrylate, hydroxypropyl (meth)acrylate, 1,4-butanediol mono(meth)acrylate, neopentylglycol mono(meth)acrylate, trimethylolpropane mono- and di(meth)acrylate, pentaerythritol di- and tri(meth)acrylate. Particular preference is given to esters selected from among 2-hydroxyethyl acrylate, hydroxypropyl acrylate and 1,4-butanediol monoacrylate.

In addition, concomitant use can be made of saturated amine or alcohol components. Suitable saturated alcohol components are, for example, linear monools, diols and polyols having 1–14 carbon atoms, branched monools, diols and polyols having 3–20 carbon atoms and cyclic monools, diols and polyols having 3–14 carbon atoms. Preference is given to methanol, ethanol, n-propanol, i-propanol, n-butanol, i-butanol, tert-butanol, ethylene glycol, butanediol, hexanediol, cyclohexanediol, glycerol, trimethylolpropane and pentaerythritol.

The prepolymer is preferably essentially free of isocyanate groups. It is therefore preferably prepared using an equivalence ratio of the sum of isocyanate-reactive groups to isocyanate groups of from 0.9:1 to 1.1:1, in particular about 1:1. It is preferred that 50–100 mol %, in particular 60–90 mol %, of the isocyanate-reactive groups originate from the ethylenically unsaturated compound and 0–50 mol %, in particular 10–40 mol %, originate from the saturated compound.

The preparation of the prepolymer by reacting the polyisocyanate component and the compounds containing isocyanate-reactive groups can be carried out by known methods, if desired using suitable polyaddition catalysts. Suitable catalysts are, for example, tin(II) octoate, dibutyltin dilaurate and tertiary amines such as dimethylbenzylamine. The reaction can be carried out in bulk or in the presence of components suitable as reactive diluents and/or in the presence of a solvent, as long as these components contain no H atoms which are reactive toward isocyanates.

To avoid an undesired, premature polymerization of the ethylenically unsaturated groups, polymerization inhibitors may, if desired, be added in the preparation of the polyurethane. Inhibitors which are suitable for this purpose are, for example, quinones, phenols or phenol derivatives, e.g. para-benzoquinone, hydroquinone, p-methoxyphenol, phenothiazine, 2,2,6,6-tetra-methylpiperidin-1-yloxy, 4-hydroxy-2,2,6,6-tetramethylpiperidin-1-yloxy, etc.

The curable composition of the present invention generally comprises a reactive diluent. Suitable amounts of reactive diluent are 0–80% by weight, preferably 10–50% by weight, based on the composition.

Examples of suitable reactive diluents are monomers containing vinyl groups, in particular N-vinyl compounds such as N-vinylpyrrolidol, N-vinylcaprolactam and N-vinylformamide, also vinyl ethers such as ethyl vinyl ether, propyl vinyl ether, isopropyl vinyl ether, butyl vinyl ether, isobutyl vinyl ether, tert-butyl vinyl ether, amyl vinyl ether, 2-ethylhexyl vinyl ether, dodecyl vinyl ether, octadecyl vinyl ether, cyclohexyl vinyl ether, ethylene glycol monovinyl and divinyl ethers, diethylene, triethylene and tetraethylen glycol monovinyl and divinyl ethers, polyethylene glycol divinyl ether, ethylene glycol butyl vinyl ether, triethylene glycol methyl vinyl ether, polyethylene glycol methyl vinyl ether, cyclohexanedimethanol monovinyl and divinyl ethers, trimethylolpropane trivinyl ether, aminopropyl vinyl ether, diethylaminoethyl vinyl ether and propyltetrahydrofuran divinyl ether, vinyl esters such as vinyl acetate, propionate, stearate and laurate, and vinylaromatics such as vinyltoluene, styrene, 2- and 4-butylstyrene and 4-decylstyrene, and also monomers containing acrylate or methacrylate groups, e.g. hydroxyethyl (meth)acrylate, tripropylene glycol methyl ether (meth)acrylate, cyclohexyl (meth)acrylate, 4-tert-butylcyclohexyl (meth)acrylate, trimethylolpropane monoformal acrylate, glycerol monoformal acrylate, 4-tetrahydropyranyl acrylate, 2-tetrahydropyranyl methylacrylate and tetrahydrofurfuryl acrylate.

Preferred reactive diluents are bifunctional or polyfunctional esters of α,β-ethylenically unsaturated carboxylic acids with aliphatic diols or polyols, in particular diesters of α,β-ethylenically unsaturated carboxylic acids such as acrylic acid or methacrylic acid with $C_2$–$C_{14}$-diols. Suitable esters of this type are, for example, ethylene glycol di(meth) acrylate, propylene glycol di(meth)acrylate, butylene glycol di(meth)acrylate, 1,6-hexanediol di(meth)acrylate, decanediol di(meth)acrylate, diethylene glycol di(meth) acrylate, triethylene glycol di(meth)acrylate, dipropylene glycol di(meth)acrylate, tripropylene glycol di(meth) acrylate, 1,4-cyclohexanediol di(meth)acrylate and 1,4-bis (hydroxymethyl)cyclohexane di(meth)acrylate, also trimethylolethane tri(meth)acrylate, trimethylolpropane tri (meth)acrylate and pentaerythritol tetra(meth)acrylate. The esters of ethoxylated polyols, e.g. the triacrylate or the trimethacrylate of ethoxylated trimethylolpropane.

In addition, the curable compositions of the present invention can, depending on the application, contain from 0 to 80% by weight of solvent and up to 20% by weight, based on the total weight of the composition, of customary auxiliaries, thickeners, leveling agents, antifoams, UV stabilizers, lubricants and fillers. Those skilled in surface coating technology will be familiar with suitable auxiliaries. Suitable fillers encompass silicates, e.g. silicates obtainable by hydrolysis of silicon tetrachloride, for example Aerosil® from Degussa, diatomaceous earth, talc, aluminum silicates, magnesium silicates, calcium carbonates, etc. Suitable stabilizers include typical UV absorbers such as oxanilides, triazines and benzotriazole and also benzophenones. These can be used alone or together with suitable free radical traps, for example sterically hindered amines such as 2,2,6,6-tetramethylpiperidine, 2,6-di-tert-butylpiperidine or their derivatives, e.g. bis(2,2,6,6-tetramethyl-4-piperidyl) sebacate. Stabilizers are usually used in amounts of 0.1–5.0% by weight, based on the total weight of the composition.

Examples of suitable solvents are $C_5$–$C_8$-hydrocarbons or cyclic hydrocarbons, fluorinated, chorinated hydrocarbons, $C_1$–$C_6$-alkanols or cycloalkanols and solvent systems comprising alcohols such as methanol, ethanol, propanol, i-propanol, n-butanol, i-butanol, and/or aliphatic esters such as ethyl acetate or butyl acetate.

If curing is carried out by means of UV radiation, the compositions of the present invention further comprise at least one photoinitiator which can initiate the polymerization of ethylenically unsaturated double bonds. Such photoinitiators include benzophenone and benzophenone derivatives such as 4-phenylbenzophenone and 4-chlorobenzophenone, Michler's ketone, anthrone, acetophenone derivatives such as 1-benzoylcyclohexan-1-ol, 2-hydroxy-2,2-dimethylacetophenone and 2,2-dimethoxy-2-phenylacetophenone, benzoin and benzoin ethers such as benzoin methyl, ethyl or butyl ether, benzil ketals such as benzil dimethyl ketal, 2-methyl-1-[4-(methylthio)phenyl]-2-morpholinopropan-1-one, anthraquinone and its derivatives such as β-methylanthrachinone and tert-butylanthraquinone, azylphosphine oxides such as 2,4,6-trimethylbenzoyldiphenylphosphine oxide, ethyl 2,4,6-trimethylbenzoylphenyldiphosphinate and bisacylphosphine oxides. The photoinitiators mentioned are used, if necessary, in amounts of 0.05–20% by weight, preferably 0.1–10% by weight and in particular 0.2–5% by weight, based on the total weight of the composition. If the composition of the present invention is cured by means of electron radiation, photoinitiators can be omitted.

The compositions of the present invention give paints or coatings having a balanced property profile in respect of scratch resistance, chemical resistance, yellowing resistance and weathering resistance. Thus, for example, this scratch resistance is considerably improved compared to a composition based on isophorone diisocyanate without the chemical resistance being impaired. In addition, the coatings are resistant to weathering and not susceptible to yellowing. The compositions of the present invention are particularly useful for coating substrates such as metal (coil and can coating), exterior parts of automobiles, plastics such as PC, PVC, skies, snowboards, plastic fenders and other automotive parts, etc., and mineral substrates such as roofing tiles, Eternit sheets, etc.

Accordingly, the present invention also provides a process for coating substrates as well as the coated substrates obtainable by this process. The substrates are generally coated by applying at least one curable composition according to the present invention in the desired thickness to the substrate to be coated, if appropriate removing solvent present and subsequently curing the composition thermally or by action of high-energy radiation such as UV radiation or electron radiation. This procedure can, if desired, be repeated one or more times. The curable compositions are applied to the substrate in a known manner, e.g. by spraying, knife coating, doctor blade coating, brushing, rolling or casting. The coating thickness is generally in the range 3–500 g/m$^2$ and preferably 10–200 g/m$^2$, corresponding to wet film thickness of about 3–500 μm, preferably 10–200 μm. The application can be carried out at room temperature or at elevated temperature, but preferably not above 100° C. Subsequently, the coatings are cured thermally or by action of the high-energy radiation, preferably UV radiation having a wavelength of 250–400 nm, or by irradiation with high-energy electrons (electron beam; 150–300 kev). Suitable UV sources are, for example, high-pressure mercury vapor lamps, e.g. CK or CK1 lamps from IST. The radiation dose which is usually sufficient for crosslinking in the case of UV curing is in the range 80–3000 mJ/cm$^2$.

The invention is illustrated by the following examples.

EXAMPLE 1
Preparation of an Isocyanurate from 1,3-bis(Isocyanatomethyl)-Cyclohexane.

1,3-Bis(isocyanatomethyl)cyclohexane was placed in a reaction vessel and heated to 100° C. while passing in nitrogen. 0.1% by weight of N,N,N-trimethyl-N-(2-hydroxypropyl)ammonium 2-ethylhexanoate was then added as catalyst and the mixture was stirred at 100° C. The decrease in the NCO content as a result of trimerization was monitored continuously by taking samples at intervals of 10 minutes. The isocyanate content was determined by reacting a defined amount of the reaction mixture with an excess of dibutylamine and backtitration of the excess using 0.1 N hydrochloric acid. At an NCO content of the mixture of 36% by weight, the trimerization was stopped by addition of 0.1% by weight of di(2-ethylhexyl)phosphate. The product mixture was subsequently freed of monomeric diisocyanate at 130° C. and a pressure of 3 mbar in a thin-film evaporator. The viscous, polymeric end product was dissolved in methoxypropyl acetate, giving an 80% strength solution. The NCO content of the solution was 15.5% by weight and the viscosity was 12,900 mpa·s (25° C.).

Preparation of the Prepolymer 26.3 g of hydroxyethyl acrylate, 40.36 g of hexanediol diacrylate, 0.05 g of hydroquinone monomethyl ether, 0.09 g of Kerobit TBK and 0.02 g of dibutyltin dilaurate were placed in a reaction flask and stirred at room temperature. 64.5 g of the isocyanurate of 1,3-bis(isocyanatomethyl)cyclohexane was added thereto over a period of 15 minutes. Stirring was continued at 70° C. until an NCO content of 2.4% was reached (6 hours). The mixture was cooled slightly, 2.9 g of methanol were added thereto and stirring was continued at 70° C. until the NCO content was 0.05%. The product was filtered through a 10 μm filter and bottled. The viscosity was 5.4 Pa·s. The infrared spectrum no longer displayed any NCO bands and contained acrylate bands (810 cm$^{-1}$).

COMPARATIVE EXAMPLE 1

A prepolymer was prepared as described in Example 1 but using the isocyanurate of isophorone diisocyanate in place of the isocyanurate of 1,3-bis(isocyanatomethyl)cyclohexane.

COMPARATIVE EXAMPLE 2

A prepolymer was prepared as described in Example 1 but using the isocyanurate of hexamethylene diisocyanate in place of the isocyanurate of 1,3-bis(isocyanatomethyl)cyclohexane.

Example of the Preparation of Curable Compositions

2% by weight of hydroxyacetophenone photoinitiator (Irgacure 184, Ciba Specialties) was added to the prepolymers prepared as described in Example 1 and Comparative Examples 1 and 2. The surface coating compositions were diluted with butyl acetate to a viscosity of 500 mpa·s. They were applied in a thickness of 100 μm to the substrates glass or sheetmetal and illuminated 3 times at a speed of 2.5 m/min in an IST illumination unit fitted with 120 watt lamps.

Assessment of the Scratch Resistance:

The scratch resistance was assessed in an abrasion test in which 50 double strips were performed with a Scotchbrite pad under a weight of 500 g. The gloss was determined before and after the abrasion test.

|  | Gloss before the abrasion test | Gloss after the abrasion test |
| --- | --- | --- |
| Example 1 | 98 | 65 |
| Comparative Example 1 | 97 | 54 |
| Comparative Example 2 | 97 | 63 |

The results show that there is a significant loss in gloss after the abrasion test for all systems. The resin of the present invention displays the lowest loss in gloss and is significantly better than the composition comprising isophorone diisocyanate.

Assessment of the Chemical Resistance:

To assess the chemical resistance, typical household chemicals were applied to the cured films, allowed to act for 24 hours and the degree of damage was then assessed on a scale from 0 to 5 (0: no damage; 5: film destroyed).

| Chemical | Example | Comp. Ex. 1 | Comp. Ex. 2 |
|---|---|---|---|
| Sodium carbonate | 0 | 0 | 0 |
| Red wine | 0 | 0 | 2 |
| Coffee | 0 | 0 | 1 |
| Blackcurrant juice | 0 | 0 | 0 |
| Ethyl acetate | 0 | 0 | 0 |
| Mustard | 1 | 0 | 2.5 |
| Lipstick | 0 | 0 | 0 |
| Disinfectant | 0 | 0 | 0 |
| Ballpoint pen ink | 4 | 4 | 4 |
| Cleaner | 0 | 0 | 0 |
| Average of 10: | 0.5 | 0.4 | 0.95 |

The results show that the chemical resistance of the composition of the present invention is significantly better than that of Comparative Example 2. It is about equally as good as that of Comparative Example 1.

These results show that the composition of the present invention surprisingly has both good scratch resistance and good chemical resistance, while urethane acrylates based on IPDI isocyanurate display good chemical resistance but poor scratch resistance and urethane acrylates based on HDI isocyanurate have good scratch resistance but poor chemical resistance.

Assessment of Yellowing and Weathering Resistance for Consistancy

In the xen on test, both the coatings produced from the composition of Example 1 and those produced from the compositions of the comparative examples display no yellowing (b values<2) after 500 hours. None of the coatings displayed cracking or degradation of the film. The xenon test was carried out in accordance with DIN 53231.

We claim:

1. A curable composition comprising a prepolymer which comprises, in copolymerized form:

(a) a bifunctional or polyfunctional isocyanate based on a compound of the formula I

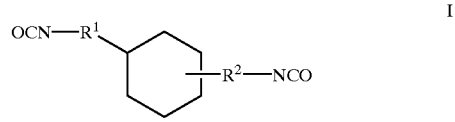

where $R^1$ and $R^2$ are independently $C_1$–$C_{12}$-alkylene, and wherein the polyfunctional isocyanate contains at least one uretdione, isocyanurate, biuret and/or allophanate group per molecule and has an NCO content in the range from 5 to 22% by weight, (b) an ethylenically unsaturated compound containing isocyanate-reactive groups and (c) if desired, a saturated compound containing isocyanate-reactive groups.

2. A composition as claimed in claim 1, wherein the compound of the formula I is 1,3- or 1,4-bis(isocyanatomethyl)cyclohexane or a mixture thereof.

3. A composition as claimed in claim 1, wherein the ethylenically unsaturated compound containing isocyanate-reactive groups is a $C_2$–$C_{12}$-hydroxyalkyl (meth)acrylate.

4. A composition as claimed in claim 1 which further comprises a reactive diluent.

5. A composition as claimed in claim 4, wherein the reactive diluent is a diester of an α,β-ethylenically unsaturated carboxylic acid with $C_2$–$C_{14}$-diols.

6. A process for coating substrates, which comprises applying a curable composition as claimed in claim 1 to the substrate to be coated and subsequently curing the composition by irradiation with UV or electron radiation.

7. A coated substrate obtainable by a process as claimed in claim 6.

* * * * *